United States Patent
Ma et al.

(10) Patent No.: US 7,436,810 B2
(45) Date of Patent: Oct. 14, 2008

(54) DETERMINATION OF WIRELESS LINK QUALITY FOR ROUTING AS A FUNCTION OF PREDICTED DELIVERY RATIO

(75) Inventors: Yunqian Ma, Roseville, MN (US); Yinzhe Yu, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 433 days.

(21) Appl. No.: 11/064,304

(22) Filed: Feb. 23, 2005

(65) Prior Publication Data

US 2006/0187884 A1  Aug. 24, 2006

(51) Int. Cl.
*H04Q 7/24* (2006.01)
*H04L 12/26* (2006.01)

(52) U.S. Cl. .............. 370/338; 370/238; 370/252; 370/395.41; 455/445; 455/67; 455/63.1; 455/452.1

(58) Field of Classification Search ............ 455/445, 455/452.2, 67.11, 67.13, 63.1; 370/238, 370/252, 395.41; 709/241
See application file for complete search history.

(56) References Cited

U.S. PATENT DOCUMENTS

| | | | |
|---|---|---|---|
| 5,412,654 A * | 5/1995 | Perkins | 370/349 |
| 2004/0165532 A1 * | 8/2004 | Poor et al. | 370/252 |
| 2005/0052996 A1 * | 3/2005 | Houck et al. | 370/230 |
| 2005/0185632 A1 * | 8/2005 | Draves et al. | 370/351 |
| 2005/0261837 A1 * | 11/2005 | Wegerich et al. | 702/19 |
| 2005/0286426 A1 * | 12/2005 | Padhye et al. | 370/238 |
| 2006/0013172 A1 * | 1/2006 | Ruuska et al. | 370/338 |

OTHER PUBLICATIONS

Yarvis et al. Real-World Experiences with an Interactive Ad Hoc Sensor Network Aug. 2002.*
Aguayo, Daniel, et al., "Link-level measurements from an 802.11b mesh network", *ACM SIGCOMM Computer Communication Review*, 34(4), (Oct. 2004), 121-132.
Cass, Stephen, "Viva Mesh Vega—The Gambline Capital Antes Up For A New Mobile Broadband Technology", *IEEE Spectrum*, (Jan. 2005).
Kotz, David, et al., "The mistaken axioms of wireless-network research", *Dartmouth College Computer Science Technical Report TR2003-467*, (Jul. 18, 2003), 1-14.

* cited by examiner

*Primary Examiner*—Lester Kincaid
*Assistant Examiner*—Daniel Lai
(74) *Attorney, Agent, or Firm*—Kris T. Fredrick

(57) ABSTRACT

Packet signal-to-noise ratio (SNR) values and historical delivery ratio information are combined to predict a delivery ratio for a communication link. Since packet SNR may be available with every received packet on the link, link SNR level is both accurate and easy to obtain. In one embodiment, a link quality classification algorithm uses delivery ratio and SNR history, based on local classification methods (such as k-Nearest-Neighbor, Kernel-based method) and global classification methods (e.g. Support vector machines) to classify links as either good or bad. In further embodiments, links may be classified at multiple different levels to indicate predicted link quality.

20 Claims, 3 Drawing Sheets

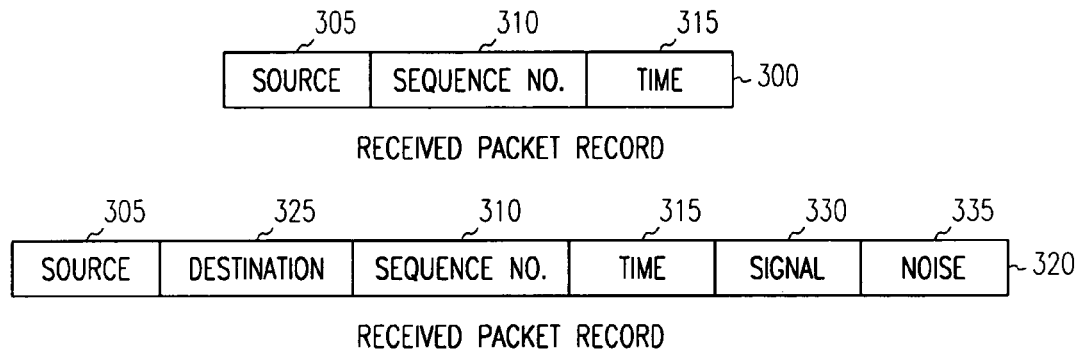
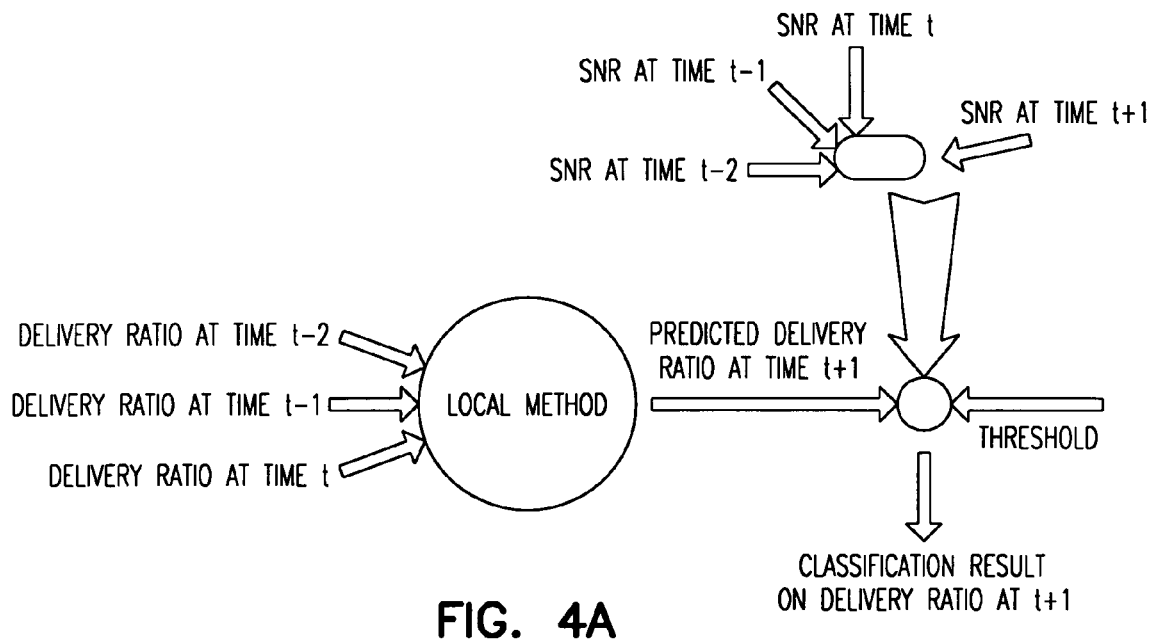
FIG. 4A
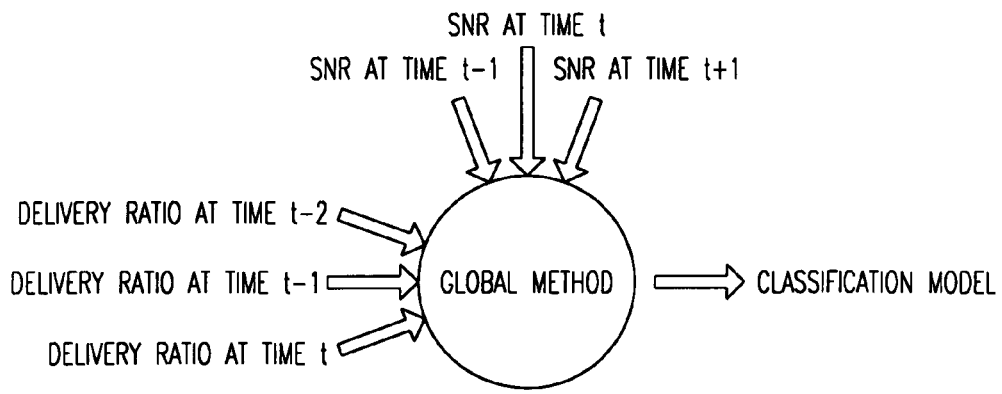
FIG. 4B

500

505 — $\hat{y}_{t+1} = DRSNR(t, d_{Threshold}, Border)$

510 — 1: $\hat{d}_{t+1} = f(d_{t-2}, d_{t-1}, d_t)$

515 — 2: if $\hat{d}_{t+1} > d_{Threshold} + Border$

520 — 3: $\hat{y}_{t+1} = 1$

525 — 4: else if $\hat{d}_{t+1} < d_{Threshold} - Border$

530 — 5: $\hat{y}_{t+1} = -1$

535 — 6: else

540 — 7: if $r_{t+1} > g(r_{t-2}, r_{t-1}, r_t)$

545 — 8: $\hat{y}_{t+1} = 1$

550 — 9: else

555 — 10: $\hat{y}_{t+1} = -1$

FIG. 5

DETERMINATION OF WIRELESS LINK QUALITY FOR ROUTING AS A FUNCTION OF PREDICTED DELIVERY RATIO

BACKGROUND

Wireless mesh and ad hoc networks route packets through links between nodes in the network from a source node to a destination node. Inaccurate prediction of wireless link quality can lead to routing of packets over poor quality links. This can result in low end-to-end throughput and low quality of service.

Delivery ratio prediction algorithms are used to predict a wireless link delivery ratio with packet SNR (signal-to-noise ratio) values. Existing delivery ratio prediction algorithms use historical deliver ratio data only as an algorithm input. Factors such as channel fading, multi-path interference and physical obstruction, can result in the delivery ratio of wireless links being highly volatile. Further, as deliver ratio is inherently a probability value, an exorbitant number of probe packets need to be transmitted (to accumulate a satisfactory historical delivery ratio series) to obtain higher prediction accuracy. Better algorithms are needed to effectively operate high-demanding communication applications, such as voice over IP, in wireless mesh/ad hoc networks.

SUMMARY

Packet signal-to-noise ratio (SNR) values and historical delivery ratio information are combined to predict a delivery ratio for a communication link. Since packet SNR is available with every received packet on the link, link SNR level is both accurate and easy to obtain. In one embodiment, a link quality classification algorithm uses delivery ratio and SNR history, based on local classification methods (such as k-Nearest-Neighbor, Kernel-based method) and global classification methods (e.g. Support vector machines) to classify links as either good or bad. In further embodiments, links may be classified at multiple different levels to indicate predicted link quality.

BRIEF DESCRIPTION OF THE DRAWINGS

FIG. 3 is a timing block diagram illustrating a process for determining link quality according to an example embodiment.

FIGS. 4A and 4B are block diagrams illustrating local and global classification systems according to example embodiments.

FIG. 5 is a diagram of a classifier denoting samples from different classes according to an example embodiment.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

The functions or algorithms described herein are implemented in software or a combination of software and human implemented procedures in one embodiment. The software comprises computer executable instructions stored on computer readable media such as memory or other type of storage devices. Further, such functions correspond to modules, which are software, hardware, firmware or any combination thereof. Multiple functions are performed in one or more modules as desired, and the embodiments described are merely examples. The software is executed on a digital signal processor, ASIC, microprocessor, or other type of processor operating on a computer system, such as a personal computer, server or other computer system.

Figure 1:
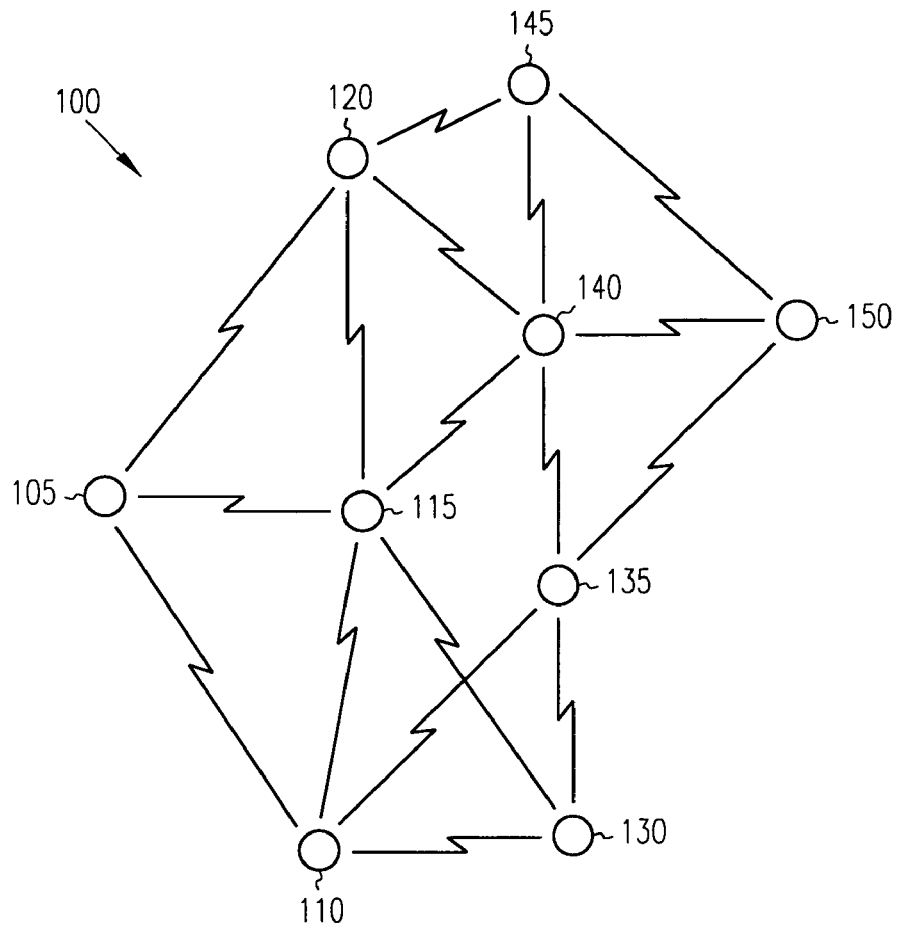
FIG. 1 is a block diagram of a wireless network of nodes according to an example embodiment.

FIG. 1 is an example of a wireless ad-hoc network 100. The network is made up of many nodes that transmit and receive packets of information in accordance with one of many available protocols. One example network 100 is a wireless mesh network. A wireless mesh network is a network composed of static nodes connected with wireless radios (e.g., 802.11b) where there may not be an infrastructure node such as access points in wireless LAN. In some embodiments, every node in a wireless mesh network is a router as well as an end host, relaying traffic for one another through multiple hops. Network 100 in FIG. 1 is a simple example of such a network. While only 9 nodes, 105, 110, 115, 120, 130, 135, 140, 145 and 150 are shown, hundreds of nodes or more may be included in such networks. Wireless links are represented between nodes that are near each other in FIG. 1. Many nodes may have links to multiple other nodes. This is illustrated at least by node 105 having links to nodes 110, 115 and 120. Other links to further nodes may also exist even if not illustrated in FIG. 1.

Accurate prediction of a packet delivery ratio for each wireless link in the network can aid routing protocols in selecting paths for packets that are most likely to result in delivery of the packets with minimum retransmission required. In some networks, it allows the exclusion of low quality links from the network topology. Predicting the packet delivery ratio may be achieved by sending probe packets periodically on wireless links. Unfortunately, due to factors such as channel fading, multi-path interference and physical obstruction, the delivery ratio of wireless links can be highly volatile. Besides, delivery ratio, which determines the number of retransmissions a sender performs to successfully deliver a packet to its one-hop receiver on a wireless link, is inherently a probability value. It can take a large number of probes to get an accurate estimation of it.

Packet SNR (signal to noise ratio), on the other hand is an easy-to-obtain value that comes with every probe packet. For example some commercially available wireless cards return an "RSSI" (receiver signal strength indication, which roughly corresponds to the signal level of a packet) and a "silence value" (noise level) value for every received packet. A packet's SNR can be derived by simply subtracting the silence value from the RSSI. Due to the obvious potential causal relationship between SNR and delivery ratio (higher SNR leads to higher packet delivery ratio). However, simple mapping between SNR and delivery ratio has not been done, and SNR is not thought to be a reliable predictive tool.

Figure 2:
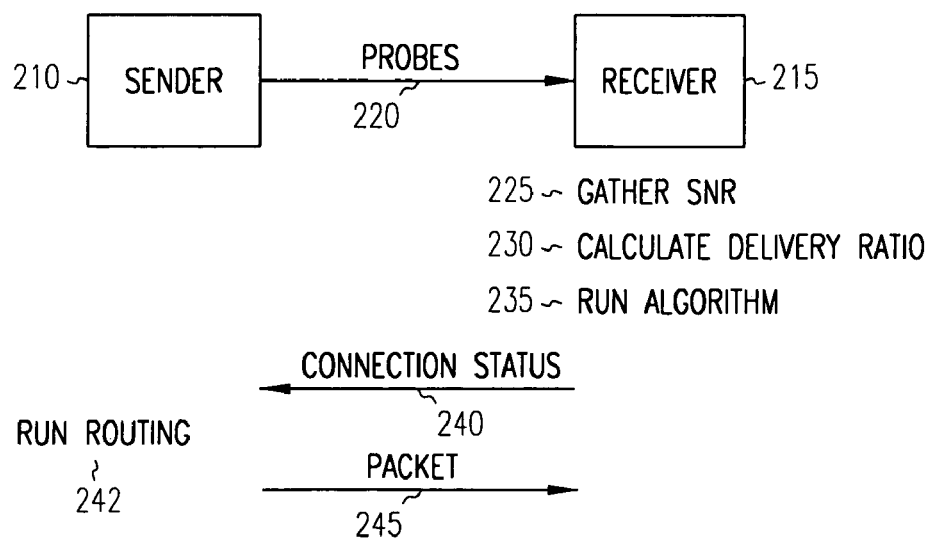
FIG. 2 is a pseudo code diagram illustrating a method of predicting a delivery ratio for a link according to an example embodiment.

FIG. 2 is a flowchart illustrating a process for determining whether or not to send a packet on a given link between nodes. A sender node 210 is coupled to a receiver node 215 by a link. Communications over the link, such as probes 220 are represented by arrows between the nodes. Probes 220 may be periodically sent over links. A signal to noise ratio is gathered by the receiver 215 at 225. In one embodiment, each probe packet is delivered with a receiver signal strength indication, which roughly corresponds to the signal level of a packet, and a silence value or noise level value. A SNR for a packet may be derived by simply subtracting the silence value from the receiver signal strength indication (RSSI).

After multiple probes have been sent, a delivery ratio may be calculated as indicated at 230. In one embodiment, the delivery ratio is calculated as the fraction of probe packets a receiver receives successfully from its one-hop sender on a wireless link during a period. To obtain very accurate delivery ratios, many probes may need to be sent.

At 235, an algorithm utilizing both delivery ratio and measured SNR is used to determine whether or not a link is desirable for use. The algorithm will be described in further detail below, but basically involves first using the delivery ratio estimate to make the desirability determination, and if it is within a border threshold of a desired ratio, then using the SNR to make the final determination.

At 240, a connection status is communicated to the sender. If the status is acceptable, the sender may run a routing algorithm to determine which links to use for sending a packet. If the link to receiver 215 is selected, and if the connection status is acceptable, the packet may be sent at 245 to receiver 215.

In one example mesh network, data was gathered to determine if there was a correlation between SNR and delivery ratio. The example mesh network consisted of 38-nodes distributed over roughly six square kilometers in an urban area. Each node consisted of a PC (personal computer) with an 802.11b card connected to an omni-directional antenna mounted on the roof of a building. Each node in turn sent 1500-byte 802.11 broadcast packets as fast as possible, while the rest of the nodes passively listened. Each sender sent for 90 seconds at each of the 802.11b bit-rates (1 Mbps, 2 Mbps, 5.5 Mbps and 11 Mbps). Each packet had a unique sequence number. The sender recorded, as illustrated at 300 in FIG. 3, a source indicator 305, sequence number 310 and the time 315 at which it sent each packet. The receiving nodes recorded each received packet's source 305, destination 325, sequence number 310, arrival time 315, and the "RSSI" (signal) 330 and "silence" (noise) 335 values. Since every packet is broadcasted, no link-level acknowledgements or retransmissions were used.

Records of the types (sent and received) were matched with the "Source" and "Sequence No." fields. Since every node sent for 90 seconds, the entire sending time may be divided into 450 0.2-sec slots. For each time slot, the delivery ratio for a uni-directional link is calculated, with s as its source end node and d as its destination end node, as follows (the set of packets sent out by s during the time slot are denoted by P):

$$DR \frac{\text{\# of packets among } P \text{ that are ever received by } d}{\text{\# of packets in } P}.$$

To obtain the average SNR value of each time slot of a link, the SNR value of each received packet may be calculated by subtracting its noise value from its signal value. The SNR value of a specific time slot on a link may then obtained by averaging over all the packets received during the slot on that link.

Next, a simple taxonomy on the 352 uni-directional links in the measurement trace is performed. These links are partitioned according to the mean and standard deviation of each link's 450 delivery ratio values in 90 seconds. The links then are partitioned into three types:

Type I: $\mu_d > 0.3$ and $\sigma_d < 0.15$. Delivery ratio has acceptable mean and small variance.

Type II: $\mu_d > 0.3$ and $\sigma_d \geq 0.15$. Delivery ratio has acceptable mean and large variance.

Type III: $\mu_d \leq 0.3$. Average delivery ratio is too low to be useful links.

Experiments were focused on the 27 links in Type II category, since Type III links have low delivery ratio and therefore are generally unusable, Type I links are links with high delivery ratio and low volatility, hence may not need constant monitoring of link quality.

Prediction of wireless delivery ratio is viewed as a standard (binary) classification problem under the general setting for predictive learning. The delivery ratio at time t+1 is to be predicted and the link assigned a class label, y.

$$y_{t+1} = \begin{cases} 1 & d_{t+1} > d_{Threshold} \\ -1 & \text{otherwise} \end{cases} \tag{1}$$

where $d_{t+1}$ is the exact value of delivery ratio at time t+1. $d_{Threshold}$ is predefined. The class label $y_{t+1}$ helps to specify "good link", 1, or "bad link", −1, which benefits whether to include the (wireless) link into network topology (i.e., to use or not to use the link in t+1).

Performance metric: prediction accuracy is defined as:

$$R_{pred} = \frac{1}{n_{test}} \sum_{i=1}^{n_{test}} L(y_i, \hat{y}_i) \tag{2}$$

where the loss function $$L(y_i, \hat{y}_i) = \begin{cases} 0 & y_i = \hat{y}_i \\ 1 & y_i \neq \hat{y}_i \end{cases}$$

Formula (2) represents the generalization ability of the learning system. $n_{test}$ is the number of data in the test set and estimate $\hat{y}_i$ can be obtained by various classification methods. In this paper, we use both local classification methods (K-nearest neighbor method and Kernel method) and global classification methods (support vector machines).

Two local methods, K-nearest neighbor method and Kernel method may be used to estimate the exact value of $d_{t+1}$ in formula (1). FIG. 4A illustrates such local classification methods. In k-nearest neighbors regression method, the function is estimated by taking a local average of the training data. Locality is defined in terms of the k data points nearest the estimation point:

$$\hat{d} = \frac{1}{k} \sum_{x_i \in N_k(x)} d_i \tag{3}$$

where $N_k(x)$ is the neighborhood of x defined by the k closest points $x_i$ in the training data. The value of k effectively controls the width of the local region near x. Euclidean distance may be used to measure closeness. As shown in FIG. 2, the x-axis is time, so to predict $d_{t+1}$, formula (3) can be represented by $$\hat{d}_{t+1} = \frac{1}{k} \sum_{i=1}^{k} d_{t+1-i}.$$

The kernel method provides more information on local neighborhood in local methods. In one embodiment, a Nadaraya-Watson weighted average kernel estimate may be used, $$\hat{d} = \frac{\sum_{i=1}^{n} K_\lambda(x, x_i) d_i}{\sum_{i=1}^{n} K_\lambda(x, x_i)} \quad (4)$$

where $K_\lambda(x, x_i)$ is a Gaussian kernel, which have a weight function based on the Gaussian density function.

$$K_\lambda(x, x_i) = \frac{1}{\lambda} \exp\left\{-\frac{(x-x_i)^2}{2\lambda}\right\} \quad (5)$$

The parameter $\lambda$ controls the width of the valid neighborhood. The x distance between $d_{t+1}$ and $d_t$ is 1, the x distance between $d_{t+1}$ and $d_{t-1}$ is 2, etc.

For a global classification method such as a Support vector machine, as illustrated in FIG. 4B, there is a training data set and test data set. Training data set can be represented by $\{x_i, y_i\}$, $i=1, \ldots n$, where x is a multidimensional input vector $x \in R^d$ and $y \in \{-1,1\}$ is a class label. The goal is to estimate the mapping (indicator function) $x \rightarrow y$ in order to classify future samples (e.g. test data set). Learning (model estimation) is a procedure for selecting the best indicator function by minimizing the prediction risk. A simple prediction risk can be represented by formula (2). Various statistical and neural network classification methods are generally available for estimating linear and nonlinear decision boundaries for classification.

In one embodiment, a linear classifier (discriminant function) is used, $f(x)=\text{sign}(d(x))$ where $$d(x)=w \cdot x + b \quad (6)$$

Parameters (a.k.a. weights) are w and b (bias parameter).

Support vector machines (SVM) may be used for classification. Their practical successes can be attributed to solid theoretical foundations based on statistical learning theory. For a given data set, the SVM approach considers an optimal separating hyper-plane, for which the margin (distance between the closest data points to the hyper-plane) is maximized. For example, SVM formulation for linear decision boundary, non-separable case, given the training data, the (primal) optimization problem is:

$$\text{Minimize } \frac{1}{2}\|w\|^2 + C\sum_i \xi_i \quad (7)$$

$$\text{subject to } \begin{array}{l} x_i \cdot w_i + b \geq 1 - \xi_i \text{ for } y_i = +1 \\ x_i \cdot w_i + b \leq -1 + \xi_i \text{ for } y_i = -1 \end{array}$$

Solution of constrained optimization problem (7) results in a (linear) SVM decision boundary $d(x)=w \cdot x+b$. The value of regularization parameter C controls the margin, i.e. larger C—values result in SVM models with a smaller margin. Each training sample can be characterized by its distance from the margin $\xi_i \geq 0$, $i=1, \ldots, n$, a.k.a. called slack variables.

The delivery ratio prediction problem is framed as a classification problem. In one embodiment, both local classification methods (k-NN and Nadaraya-Watson kernel) and global classification methods (SVM) are used on the data from the data acquisition described above.

Classification is performed as illustrated at 500 in FIG. 5 by integrating both SNR information and past delivery ratio information. Input parameters at 505 include t the current time, $d_{Threshold}$ the threshold of "good" and "bad" quality, and a borderline or tie breaker based on the SNR. The border may be set by the user's experience, for example, the border may be 10% of the threshold.

In a real network protocol implementing the estimation algorithm, the threshold is provided by the user (e.g. the routing protocol). Note that at 505, a function $f(d_{t-2}, d_{t-1}, d_t)$ is used to estimate the delivery ratio, $d_{t+1}$. In the k-near-neighbor (k-NN) method, $f(d_{t-2}, d_{t-1}, d_t)=(d_{t-2}+d_{t-1}+d_t)/3$; In the Nadaraya-Wats kernel method, $\lambda=3$ may be used in formula (5) to obtain a weighted estimate, thereby having $f(d_{t-2}, d_{t-1}, d_t)=w_2 \cdot d_{t-2}+w_1 \cdot d_{t-1}+w_0 \cdot d_t$, where $(w_2, w_1, w_0)=$ (0.535, 0.320, 0.145). At 515, if the delivery ratio is greater than the threshold plus the border value, the classification is set to 1 at 520. If the delivery ratio is less than the threshold minus the border value at 525, then the classification is set to $-1$ at 530.

When the delivery ratio $\hat{d}_{t+1}$ is within the borderline near $d_{Threshold}$, as indicated at 535, the likelihood of the classification is weak, resulting a 'weak tie' in classification. In that case, SNR is used as a judge to break the tie. At 540, SNR values $r_{t-2}, r_{t-1}, r_t, r_{t+1}$ are used as a tie breaker. Fewer, or a greater number of SNR values may be used for different embodiments using various classification methods. $g(r_{t-2}, r_{t-1}, r_t)$ is the simple mean of the three SNR values and establishes a SNR threshold. If the measured SNR value, $r_{t+1}$, is greater than the average, the classification is set to 1 at 545. Otherwise, 550, the classification is set to $-1$ at 555.

In most observed cases, the addition of an SNR value increases the accuracy of the delivery ratio. Using three SNR values resulted in further increase in accuracy. In some cases, the addition of the SNR value actually reduced the accuracy of the measurement. This may be due to the SNR value containing a high noise component. Overall, most delivery ratio estimates were improved an average of between 6 and 8% by adding one or more SNR values to the estimation algorithm The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:
1. A method comprising:
   determining a signal to noise ratio (SNR) for a wireless communication link;

estimating a delivery ratio for information to be transmitted on the wireless communication link;

determining whether or not to use the wireless communication link for the information as a function of the estimated delivery ratio; and in the event the estimated delivery ratio is within a border, outside a desired range of delivery ratios, determining whether or not to use the wireless communication link for the information as a function of the determined signal to noise ratio.

2. The method of claim 1 wherein estimating the delivery ratio comprises collecting prior delivery ratio data for the wireless communication link.

3. The method of claim 2 wherein the prior delivery ratio data is collected from probes sent from a sender coupled to the wireless communication link.

4. The method of claim 1 wherein the method is implemented by a receiver coupled to the communication link.

5. The method of claim 4 wherein the receiver communicates a connection status to a sender coupled to the communication link based on the determination of whether or not to use the wireless communication link.

6. The method of claim 1 wherein the signal to noise ratio is determined from a packet received via the wireless communication link.

7. The method of claim 6 wherein the SNR is determined by subtracting a noise level value of a received packet from a receiver signal strength indication in the received packet.

8. A method comprising:

determining a signal to noise ratio (SNR) for a wireless communication link;

estimating a delivery ratio for information to be transmitted on the wireless communication link;

classifying the link as good in the event the estimated delivery ratio is greater than a threshold plus a border value;

classifying the link as good in the event the estimated delivery ratio is within a border on either side of the threshold value and an SNR value is greater than an SNR threshold; and otherwise classifying the link as bad.

9. The method of claim 8 wherein the SNR threshold is an average of prior SNRs.

10. The method of claim 8 wherein the SNR threshold is a previous SNR value.

11. The method of claim 8 wherein the delivery ratio is estimated as a weighted average of prior measured delivery ratios.

12. The method of claim 8 wherein the delivery ratio threshold is provided by a user.

13. A method comprising:

determining a signal to noise ratio (SNR) for a wireless communication link;

estimating a delivery ratio for information to be transmitted on the wireless communication link;

strongly or weakly classifying the link as good or bad as a function of a threshold range of the estimated delivery ratio; and in the event the link is weakly classified as good, classifying the link as good or bad as a function of the determined SNR.

14. A node for a wireless network, the node comprising:

a module that determines a signal to noise ratio (SNR) for a wireless communication link;

a module that estimates a delivery ratio for information to be transmitted on the wireless communication link; and a module that classifies the link as good the event the estimated delivery ratio is greater than a threshold plus a border value, and classifies the link as good the event the estimated delivery ratio is within a border on either side of the threshold value and an SNR value is greater than an SNR threshold, and otherwise classifies the link as bad.

15. The node of claim 14 wherein the node is a receiver node, and wherein the receiver node sends the classification to a sender node.

16. A computer readable medium having instructions for causing a computer to perform a method comprising:

determining a signal to noise ratio (SNR) for a wireless communication link;

estimating a delivery ratio for information to be transmitted on the wireless communication link;

determining whether or not to use the wireless communication link for the information as a function of the estimated delivery ratio; and in the event the estimated delivery ratio is within a border, outside a desired range of delivery ratios, determining whether or not to use the wireless communication link for the information as a function of the determined signal to noise ratio.

17. A method comprising:

determining a signal to noise ratio (SNR) for a wireless communication link;

estimating a delivery ratio for information to be transmitted on the wireless communication link;

classifying the wireless communication link as good or bad for a future transmission as a function of the estimated delivery ratio;

in the event the wireless communication link is classified as bad, and the estimated delivery ratio is within a border, outside a desired range of delivery ratios, determining whether or not to use the wireless communication link for the information as a function of the signal to noise ratio;

sending the classification to a sender node coupled to the communication link;

executing a routing algorithm; and sending the future transmission over the wireless communication link if selected by the routing algorithm if the wireless communication link is classified as good.

18. The method of claim 17 wherein the delivery ratio is estimated as a function of a k-near-neighbor method or a Nadaraya-Watson kernel method.

19. The method of claim 17 wherein the classification is based on a support vector machines (SVM) method.

20. The method of claim 17 wherein the SNR is determined by subtracting a noise level value of a received packet from a receiver signal strength indication in the received packet.

* * * * *